(12) United States Patent
Baker et al.

(10) Patent No.: US 8,195,216 B2
(45) Date of Patent: *Jun. 5, 2012

(54) RADIO COMMUNICATION SYSTEM

(75) Inventors: Matthew P. J. Baker, Canterbury (GB);
Timothy J. Moulsley, Caterham (GB);
Bernard Hunt, Redhill (GB)

(73) Assignees: Koninklijke Philips Electronics N.V.,
Eindhoven (NL); Sharp Corporation,
Osaka (JP)

( * ) Notice: Subject to any disclaimer, the term of this patent is extended or adjusted under 35 U.S.C. 154(b) by 27 days.

This patent is subject to a terminal disclaimer.

(21) Appl. No.: 10/871,887

(22) Filed: Jun. 17, 2004

(65) Prior Publication Data

US 2005/0020296 A1 Jan. 27, 2005

Related U.S. Application Data

(63) Continuation of application No. 09/478,475, filed on Jan. 6, 2000, now Pat. No. 6,754,505.

(30) Foreign Application Priority Data

| Jan. 16, 1999 | (GB) | 9900910.2 |
| May 20, 1999 | (GB) | 9911622.0 |
| Jul. 2, 1999 | (GB) | 9915569.9 |
| Sep. 24, 1999 | (GB) | 9922575.7 |

(51) Int. Cl.
*H04B 7/00* (2006.01)

(52) U.S. Cl. ............ 455/522; 455/68; 455/69; 455/424; 455/561; 370/310; 370/310.2; 370/311; 370/318

(58) Field of Classification Search .......... 455/68, 455/69, 70, 522, 515, 127.1, 523, 453, 424, 455/425, 550.1, 561, 560, 562.1; 370/311, 370/318, 322, 310.2, 310

See application file for complete search history.

(56) References Cited

U.S. PATENT DOCUMENTS

| 5,056,109 | A | * | 10/1991 | Gilhousen et al. | 370/342 |
| 5,357,513 | A | * | 10/1994 | Kay et al. | 370/332 |
| 5,487,180 | A |  | 1/1996 | Ohtake |  |
| 5,603,096 | A | * | 2/1997 | Gilhousen et al. | 455/69 |
| 5,621,723 | A |  | 4/1997 | Walton, Jr. et al. |  |
| 5,710,982 | A | * | 1/1998 | Laborde et al. | 455/69 |
| 5,713,074 | A | * | 1/1998 | Hulbert | 455/69 |

(Continued)

FOREIGN PATENT DOCUMENTS

JP 1066139 3/1998

(Continued)

OTHER PUBLICATIONS

Patent Abstract of Japan: Publication No. 10224294A, Date of Publication: Aug. 21, 1998. Intl. CL. H04B 7/26.

*Primary Examiner* — Olumide T Ajibade Akonai

(57) ABSTRACT

A radio communication system has means for improving power control of a communication channel for the transmission of data after an interruption in the transmission. This is done by adjusting the transmission power immediately after the interruption by an offset from the power used before the interruption. The offset may be fixed or may be determined from the transmission power in the period before the interruption. This technique reduces, on average, the time taken for power control to be re-established, thereby addressing the problem that data transmissions immediately after the interruption are likely to be corrupted if the power level is too low, or to generate extra interference if the power level is too high.

13 Claims, 3 Drawing Sheets

U.S. PATENT DOCUMENTS

| | | | |
|---|---|---|---|
| 5,806,003 A * | 9/1998 | Jolma et al. | 455/522 |
| 5,896,411 A * | 4/1999 | Ali et al. | 375/130 |
| 5,924,043 A * | 7/1999 | Takano | 455/522 |
| 5,933,811 A | 8/1999 | Angles et al. | |
| 5,946,346 A * | 8/1999 | Ahmed et al. | 375/219 |
| 6,104,918 A * | 8/2000 | Saario et al. | 455/126 |
| 6,173,162 B1 * | 1/2001 | Dahlman et al. | 455/69 |
| 6,181,949 B1 | 1/2001 | Ozluturk et al. | |
| 6,212,399 B1 * | 4/2001 | Kumar et al. | 455/522 |
| 6,272,354 B1 | 8/2001 | Saario | |
| 6,275,478 B1 * | 8/2001 | Tiedemann, Jr. | 370/318 |
| 6,337,988 B1 * | 1/2002 | Agin et al. | 455/522 |
| 6,389,296 B1 * | 5/2002 | Shiraki et al. | 455/522 |
| 6,456,604 B1 * | 9/2002 | Lee et al. | 370/328 |
| 6,466,073 B1 | 10/2002 | Yukinari et al. | |
| 6,493,688 B1 | 12/2002 | Das et al. | |
| 6,563,430 B1 | 5/2003 | Kemink et al. | |
| 6,578,142 B1 | 6/2003 | Anderson et al. | |
| 6,587,477 B1 | 7/2003 | Takeda et al. | |
| 6,590,874 B1 | 7/2003 | Wang et al. | |
| 6,675,021 B2 * | 1/2004 | Shiraki et al. | 455/522 |
| 6,754,505 B1 | 6/2004 | Baker et al. | |
| 6,831,910 B1 * | 12/2004 | Moon et al. | 370/342 |
| 2005/0020296 A1 | 1/2005 | Baker et al. | |

FOREIGN PATENT DOCUMENTS

| | | |
|---|---|---|
| JP | 10066139 A1 | 3/1998 |
| JP | 10224294 A | 8/1998 |
| WO | 9717769 | 5/1997 |
| WO | WO9717769 | 5/1997 |
| WO | 9836508 A1 | 8/1998 |
| WO | WO9836508 | 8/1998 |
| WO | 9956405 A1 | 11/1999 |
| WO | 0017738 A1 | 3/2000 |
| WO | 0017789 A1 | 3/2000 |

\* cited by examiner

RADIO COMMUNICATION SYSTEM

CROSS REFERENCE TO RELATED APPLICATION

This is a continuation of prior application Ser. No. 09/478,475 filed Jan. 6, 2000 now U.S. Pat. No. 6,754,505.

The present invention relates to a radio communication system and further relates to primary and secondary stations for use in such a system and to a method of operating such a system. While the present specification describes a system with particular reference to the emerging Universal Mobile Telecommunication System (UMTS), it is to be understood that such techniques are equally applicable to use in other mobile radio systems.

There are two basic types of communication required between a Base Station (BS) and a Mobile Station (MS) in a radio communication system. The first is user traffic, for example speech or packet data. The second is control information, required to set and monitor various parameters of the transmission channel to enable the BS and MS to exchange the required user traffic.

In many communication systems one of the functions of the control information is to enable power control. Power control of signals transmitted to the BS from a MS is required so that the BS receives signals from different MS at approximately the same power level, while minimising the transmission power required by each MS. Power control of signals transmitted by the BS to a MS is required so that the MS receives signals from the BS with a low error rate while minimising transmission power, to reduce interference with other cells and radio systems. In a two-way radio communication system power control is normally operated in a closed loop manner, whereby the MS determines the required changes in the power of transmissions from the BS and signals these changes to the BS, and vice versa.

An example of a combined time and frequency division multiple access system employing power control is the Global System for Mobile communication (GSM), where the transmission power of both BS and MS transmitters is controlled in steps of 2 dB. Similarly, implementation of power control in a system employing spread spectrum Code Division Multiple Access (CDMA) techniques is disclosed in U.S. Pat. No. 5,056,109.

A problem with these known techniques is that at the start of a transmission, or after the transmission is interrupted, the power control loops may take some time to converge satisfactorily. Until such convergence is achieved data transmissions are likely to be received in a corrupted state if their power level is too low, or to generate extra interference if their power level is too high.

An object of the present invention is to address the above problem.

According to a first aspect of the present invention there is provided a radio communication system comprising a primary station and a plurality of secondary stations, the system having a communication channel between the primary station and a secondary station, the channel comprising an uplink and a downlink control channel for transmission of control information, including power control commands, and a data channel for the transmission of data, wherein power control means are provided for adjusting the power of the control and data channels in response to the power control commands and means are provided for setting the initial transmission power after a pause in transmission to that before the pause adjusted by an offset.

According to a second aspect of the present invention there is provided a primary station for use in a radio communication system having a communication channel between the primary station and a secondary station, the channel comprising an uplink and a downlink control channel for transmission of control information, including power control commands, and a data channel for the transmission of data, wherein power control means are provided for adjusting the power of the control and data channels in response to the power control commands and means are provided for setting the initial transmission power after a pause in transmission to that before the pause adjusted by an offset.

According to a third aspect of the present invention there is provided a secondary station for use in a radio communication system having a communication channel between the secondary station and a primary station, the channel comprising an uplink and a downlink control channel for transmission of control information, including power control commands, and a data channel for the transmission of data, wherein power control means are provided for adjusting the power of the control and data channels in response to the power control commands and means are provided for setting the initial transmission power after a pause in transmission to that before the pause adjusted by an offset.

According to a fourth aspect of the present invention there is provided a method of operating a radio communication system comprising a primary station and a plurality of secondary stations, the system having a communication channel between the primary station and a secondary station, the channel comprising an uplink and a downlink control channel for transmission of control information, including power control commands, and a data channel for the transmission of data, and at least one of the primary and secondary stations having power control means for adjusting the power of the control and data channels in response to the power control commands, the method comprising setting the initial transmission power after a pause in transmission to that before the pause adjusted by an offset.

The offset may be predetermined. Alternatively it may be determined from the difference between the last transmission power and a weighted average of the transmission power over a period (possibly predetermined) before the pause in transmission, or may be determined from a weighted sum of the power control commands applied before the pause in transmission. In such cases the offset should be quantised to an available power control step size before it is applied.

The use of more than one power control step size is known, for example from JP-A-10224294. However its use in this citation is limited to situations where power control is already established but propagation conditions are fluctuating rapidly. This citation does not address the problem of obtaining rapid convergence of power control at the start of, or after an interruption in, a transmission.

Embodiments of the present invention will now be described, by way of example, with reference to the accompanying drawings, wherein.

Figure 5:
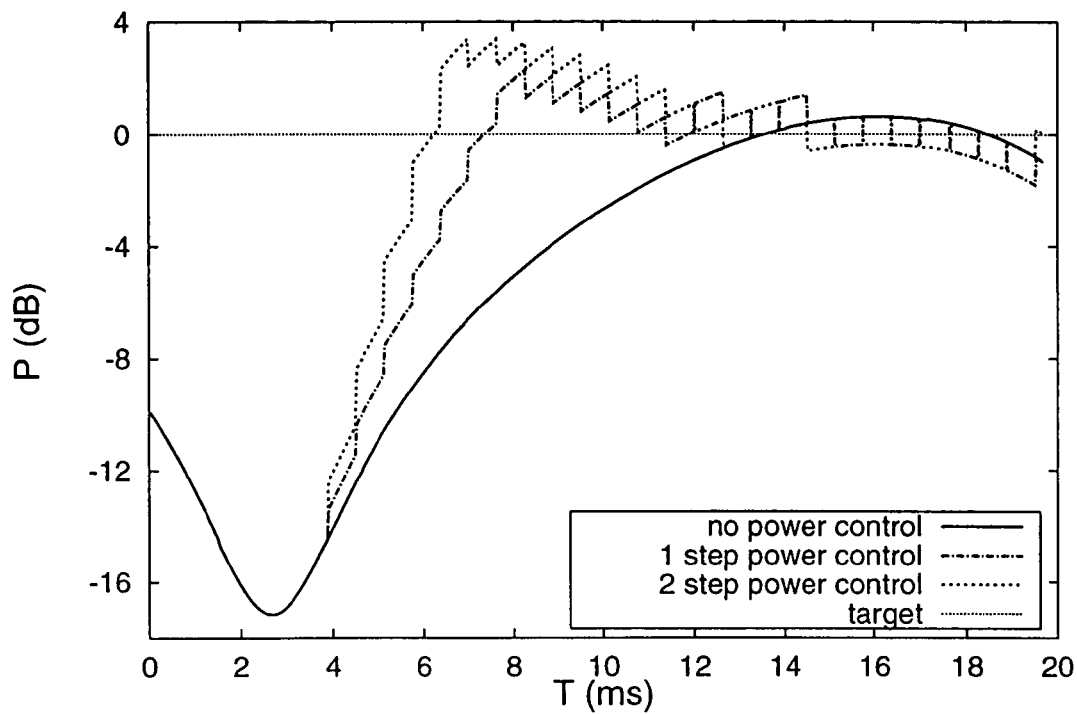
Figure 6:
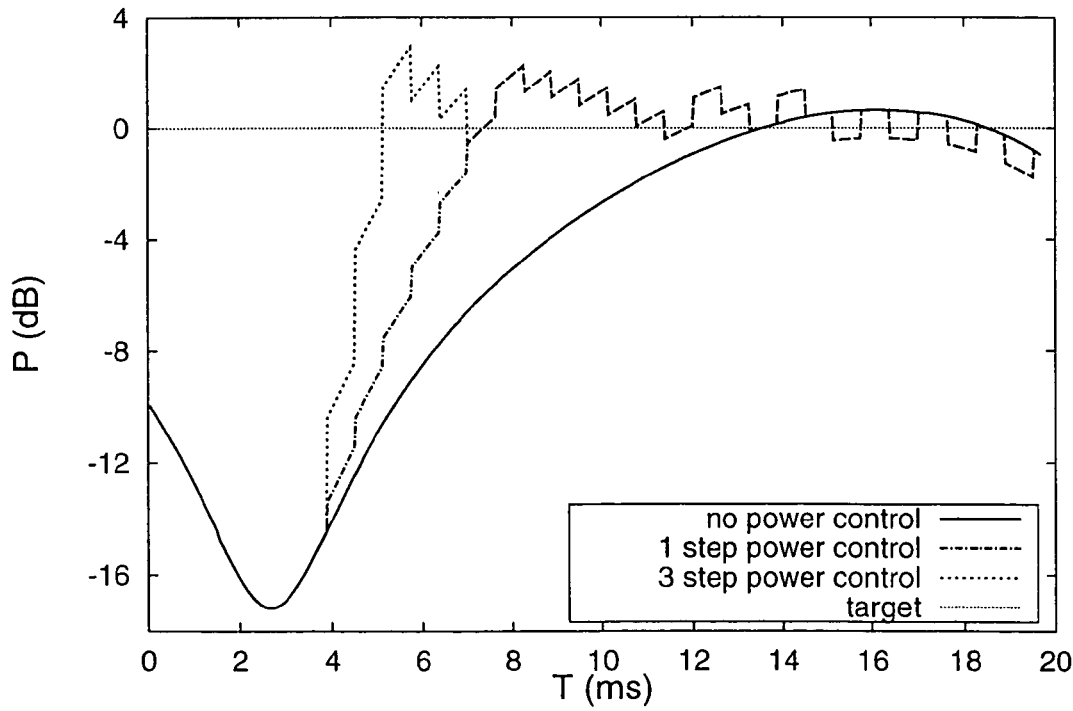

FIG. 5 is a graph of received signal power (P) in dB against time (T) in ms for different power control algorithms, the solid line indicating results with no power control, the chain dashed line indicating results with power control having a single step size, and the dashed line indicating results with power control having two step sizes; and FIG. 6 is a graph of received signal power (P) in dB against time (T) in ms for different power control algorithms, the solid line indicating results with no power control, the chain dashed line indicating results with power control having a single step size, and the dashed line indicating results with power control having three step sizes.

In the drawings the same reference numerals have been used to indicate corresponding features.

Figure 1:
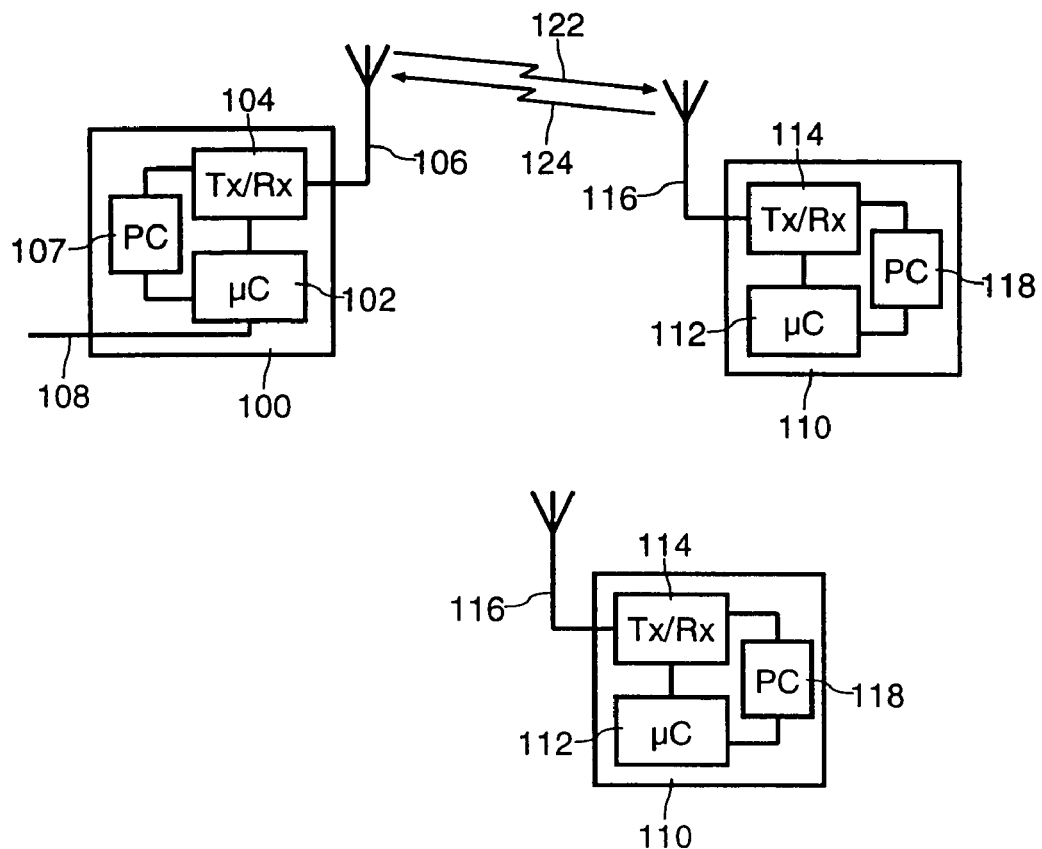
FIG. 1 is a block schematic diagram of a radio communication system.

Referring to FIG. 1, a radio communication system which can operate in a frequency division duplex mode comprises a primary station (BS) 100 and a plurality of secondary stations (MS) 110. The BS 100 comprises a microcontroller (μC) 102, transceiver means (Tx/Rx) 104 connected to antenna means 106, power control means (PC) 107 for altering the transmitted power level, and connection means 108 for connection to the PSTN or other suitable network. Each MS 110 comprises a microcontroller (μC) 112, transceiver means (Tx/Rx) 114 connected to antenna means 116, and power control means (PC) 118 for altering the transmitted power level. Communication from BS 100 to MS 110 takes place on a downlink frequency channel 122, while communication from MS 110 to BS 100 takes place on an uplink frequency channel 124.

Figure 2:
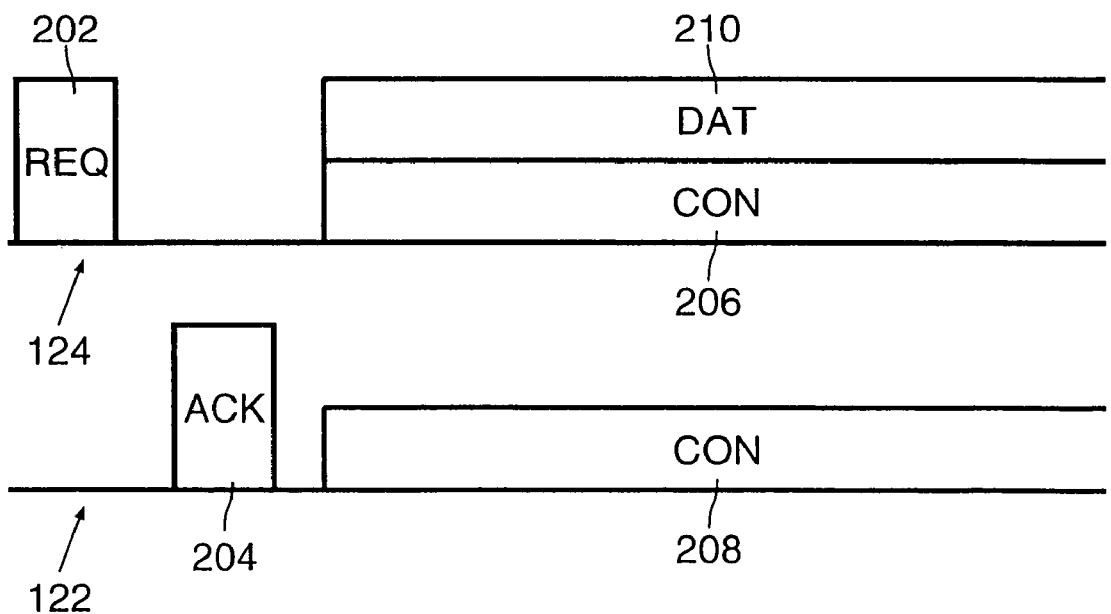
FIG. 2 illustrates a conventional scheme for establishing a communication link.

One embodiment of a radio communication system uses a scheme illustrated in simplified form in FIG. 2 for establishing a communication link between MS 110 and BS 100. The link is initiated by the MS 110 transmitting a request 202 (REQ) for resources on the uplink channel 124. If it receives the request and has available resources, the BS 100 transmits an acknowledgement 204 (ACK) on the downlink channel 122 providing the necessary information for communication to be established. After the acknowledgement 204 has been sent, two control channels (CON) are established, an uplink control channel 206 and a downlink control channel 208, and an uplink data channel 210 is established for transmission of data from the MS 110 to the BS 100. In some UMTS embodiments there may be additional signalling between the acknowledgement 204 and the establishment of the control and data channels.

In this scheme separate power control loops operate in both uplink 124 and downlink 122 channels, each comprising an inner and an outer loop. The inner loop adjusts the received power to match a target power, while the outer loop adjusts the target power to the minimum level that will maintain the required quality of service (i.e. bit error rate). However, this scheme has the problem that when transmissions start on the control channels 206, 208 and data channel 210 the initial power levels and quality target are derived from open loop measurements, which may not be sufficiently accurate as the channels on which the measurements were made are likely to have different characteristics from the newly initiated channels. The result of this is that data transmissions at the start of the data channel 210 are likely to be received in a corrupted state if they are transmitted at too low a power level, or to generate extra interference if they are transmitted at too high a power level.

One known partial solution to this problem is for the BS 100 to measure the received power level of the request 202 and to instruct the MS 110, within the acknowledgement 204, an appropriate power level for the uplink data transmission 210. This improves matters, but there may still be errors introduced by the temporal separation between the request 202 and the start of the uplink data transmission 210.

Figure 3:
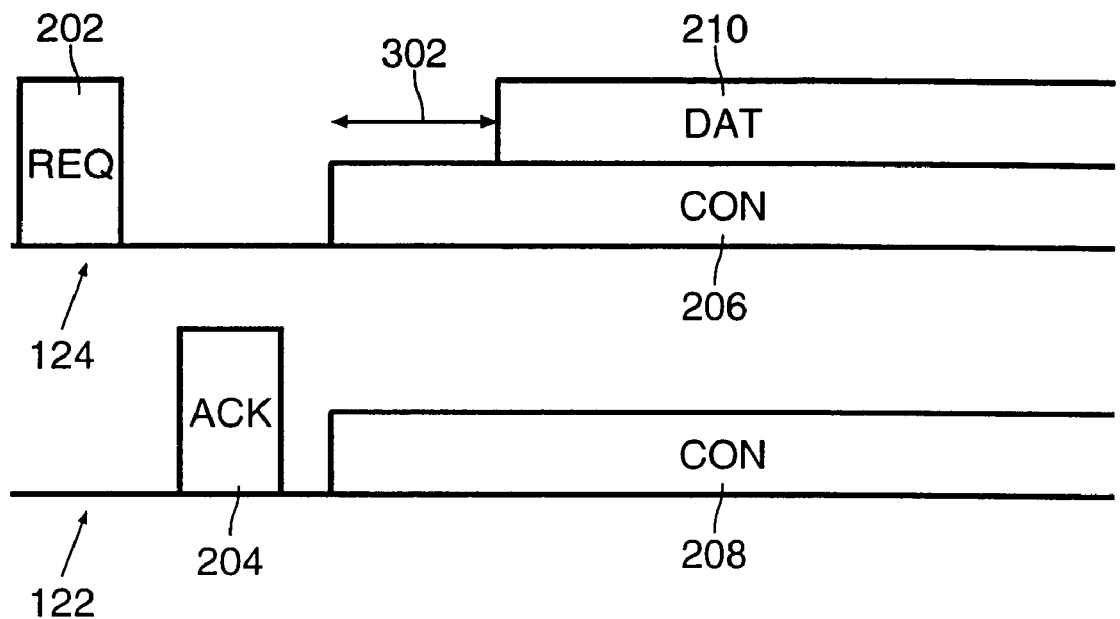
FIG. 3 illustrates a scheme for establishing a communication link having a delayed start to data transmission.

FIG. 3 illustrates a solution to the problem in which the start of the uplink data transmission 210 is delayed by a time 302 sufficient for the power control to have converged sufficiently to enable satisfactory reception of data transmissions by the BS 100. A delay of one or two frames (10 or 20 ms) is likely to be sufficient, although longer delays 302 may be permitted if necessary. The additional overhead in the transmission of extra control information on the control channels 206, 208 is balanced by a reduced Eb/No (energy per bit/noise density) for the user data received by the BS 100 over the data channel 210. The delay 302 could be predetermined or it could be determined dynamically, either by the MS 110 (which could detect convergence by monitoring downlink power control information) or the BS 100.

Figure 4:
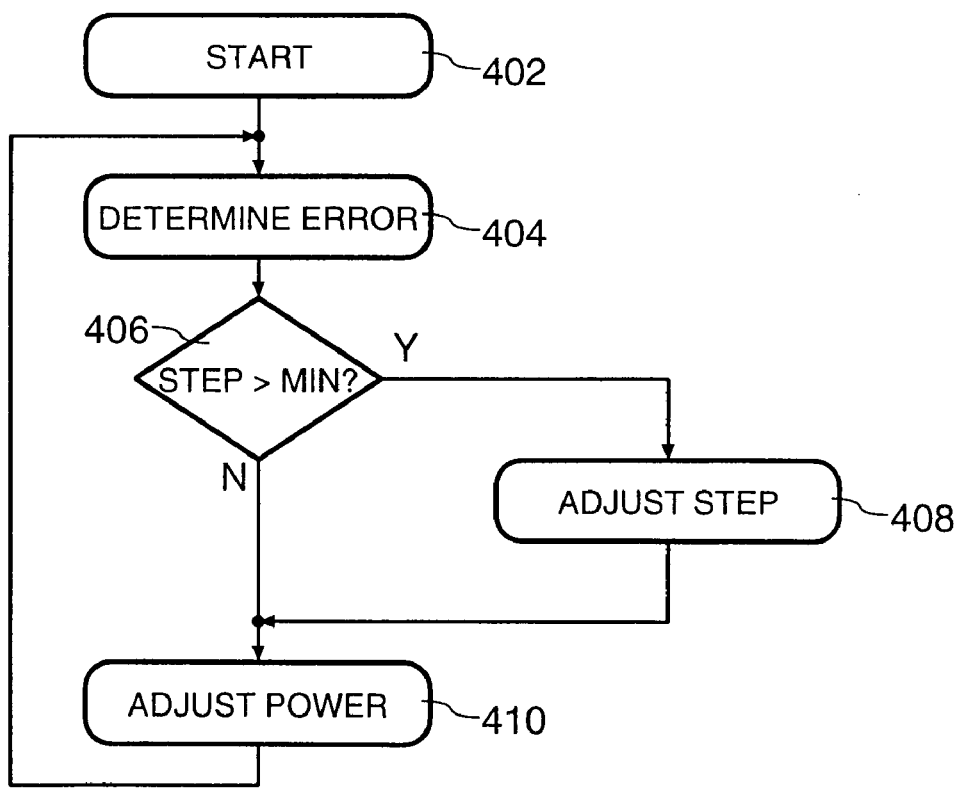
FIG. 4 is a flow chart illustrating a method for performing power control operations having a variable step size.

FIG. 4 is a flow chart showing another solution to the problem in which the power control step size is variable. Since the power control error is likely to be greatest at the start of a transmission or after an idle period, the optimum power control step size will be larger than that used for normal operation The method starts 402 with the beginning of the transmissions of the control channels 206, 208 and the data channel 210 (or the beginning of their retransmission after an interruption). The difference between the received power and target power is then determined at 404. Next the power control step size is tested at 406 to determine whether it is greater than the minimum. If it is the power control step size is adjusted at 408 before adjustment of the power at 410. The change in step size could be deterministic, or based on previous power control adjustments or on some quality measurement. The power control loop then repeats, starting at 404.

In one embodiment it is preferred to set the power control step size initially to a large value, then reduce it progressively until it reaches the value set for normal operation (which may be cell or application specific). Preferably the ratio between successive step sizes is no more than two, to allow for the possibility of correcting errors in transmission or due to other factors. The power control step size could be changed in both uplink 124 and downlink 122 channels.

As an example, consider an initial sequence of power control step sizes (in dB) of: 3.0, 2.0, 1.5, 1.0, 0.75, 0.75, 0.5, 0.5, 0.25, where 0.25 dB is the minimum step size. Using this sequence with power control signals every 1 ms, an initial error of up to 10 dB could be corrected within half a frame (5 ms), compared with 2.5 frames using the minimum power control step size of 0.25 dB that is normally used. Although as described here the step sizes are symmetric (i.e. the same step sizes are applicable to increases or decreases in power), it is known (for example from U.S. Pat. No. 5,056,109) that this is not always appropriate. In a similar example, which would be simpler to implement, the initial step size (e.g. 2 dB) is used for a predetermined number of power control commands, after which the step size is reduced (e.g. to 1 dB).

The selection of initial step size and the rate of change could be predetermined, or determined dynamically. For example, if the power level adjustment signalled in the acknowledgement 204 is large then the initial step size could be increased. As another example, if the MS 110 is able to determine by other means that it has a moderately high speed relative to the BS 100 a larger step size may be appropriate.

A fixed power control adjustment could be applied at the start of the transmission. This could be done even before receipt of any valid power control command, but the size and direction might be predetermined or determined dynamically, for example, using information such as the rate of change of the channel attenuation derived from receiver measurements. Under some channel conditions this gives an improvement in performance. Increasing the power in this way is particularly suited to the case of re-starting a transmission after an interruption, where the state of the power control loop (e.g. current power level) may be retained from before the interruption. An interruption is a pause or gap in transmission during which time one or more of the control and data channels are either not transmitted or not received (or both), but the logical connection between the BS 100 and MS 110 is maintained. It could be either unintentional, caused by a temporary loss of signal, or deliberate, typically because the MS 110 or BS 100 has no data to transmit or wishes to perform some other function such as scanning alternative channels.

In rapidly changing fading channels the channel attenuation following a pause in transmission is likely to be uncorrelated with that immediately before the pause. In such a case it may be argued that the optimum value of the initial transmission power after the gap will be equal to its average value (ignoring other slow fading effects like shadowing). This will then minimise the difference between the initial value and the optimum instantaneous value due to channel fluctuations. In practice, in one arrangement the transmission power after the gap is determined from a weighted average of the power over some extended period before the gap. A suitable averaging period would depend on particular conditions but could be of the order of 20 slots (i.e. 20 power control cycles). An additional offset or fixed power adjustment is optionally applied to this initial power level. Optimum values of such offsets for particular circumstances could be determined empirically.

In an alternative arrangement the initial power is determined from a weighted sum of power control commands, rather than measurement of the transmitted power. In this arrangement the change in power (in dB) which would need to be applied after a transmission gap could, for example, be computed recursively in the following way:

$$\Delta P(t) = P_{off} + K_1 \times (\Delta P(t-1) - P_{off}) - K_2 \times PC(t) \times PS(t)$$

where:

$\Delta P(t)$ is the change in power which would be applied after a gap, computed recursively at time t, during active transmission;

$\Delta P(0)$ could be initialised to zero;

$P_{off}$ is an additional power offset (which may be zero);

$K_1$ and $K_2$ are empirically determined constants, which could be equal, preferably such that $0 \leq K \leq 1$. The values of these constants can be chosen to reflect the effective averaging period used in calculating the power change;

$PC(t)$ is power control command applied at time t; and $PS(t)$ is the power control step size used at time t.

$\Delta P(t)$ is effectively the difference between the current power and a weighted average power, and should be quantised to an available power control step size before it is used.

One example of an embodiment in which the selection of step size is determined dynamically uses the sign of the received power control bits to determine the step size. When the MS 110 starts to receive power control commands it uses the largest available step size, and continues to use this step size until a power control command of opposite sign is received when the step size is reduced. This next step size is used until the sign of the power control commands is reversed, when the step size is again reduced. This process continues until the minimum step size is reached.

FIG. 5 is a graph showing the effect of this method in a system having two step sizes available. The graph shows how the received signal power (P) in dB, relative to a target power of 0 dB, varies with time (T). The solid line shows the received signal power without use of power control. The variation in received power could for example be due to the motion of the MS 110. The chain-dashed line shows the received power with use of power control having a single step size of 1 dB. The dashed line shows the received power with the use of power control in accordance with the above method.

In this method, when use of power control begins, at about 4 ms, a larger step size of 2 dB is used. Initially the received power is less than the target power, so all the power control commands request an increase in power and the 2 dB step size continues to be used. Eventually, at about 6 ms, the received power exceeds the target power. Once this happens the sign of the power control command reverses, to request a decrease in power, which also has the effect of reducing the step size to the standard step size of 1 dB. This step size then continues to be used in response to subsequent power control commands.

It is apparent from FIG. 5 that use of the described method enables the received power to reach its target more rapidly than is possible with a single step size. Once the target has been reached, the reduction in step size to the standard step size enables accurate power control to be maintained. Such a method enables cases where the initial error is large or the channel is rapidly changing to be handled effectively, as well as cases where convergence is achieved quickly.

The method can also be used with a greater number of available step sizes. FIG. 6 shows the same example as FIG. 5 with the exception that the dashed line shows the received power with the use of power control having three step sizes, 4 dB, 2 dB and 1 dB, available. Initially a 4 dB step size is used, with the result that the power reaches the target much more rapidly than in the previous example. When the sign of the power control command reverses, to request a reduction in power, the step size is reduced to 2 dB. When the power control command reverses again, to request an increase in power, the step size reduces to the standard step size of 1 dB, where it remains.

A variation of the above method is to continue using the larger step size for one slot after the change in sign of the power control command, which could help to correct any overshoot. However, this is unlikely to have a major impact on the average performance of the method.

Combinations of the techniques described above can readily be used to provide improved results.

Although the description above has examined data transmission on the uplink channel 124, the techniques are equally applicable to data transmission on the downlink channel 122 or to bidirectional transmissions.

Embodiments of the present invention have been described using spread spectrum Code Division Multiple Access (CDMA) techniques, as used for example in UMTS embodiments. However, it should be understood that the invention is not limited to use in CDMA systems. Similarly, although embodiments of the present invention have been described assuming frequency division duplex, the invention is not limited to use in such systems. It may also be applied to other duplex methods, for example time division duplex (although the power control rate in such a system would normally be limited to once per transmission burst).

From reading the present disclosure, other modifications will be apparent to persons skilled in the art. Such modifications may involve other features which are already known in radio communication systems and component parts thereof, and which may be used instead of or in addition to features already described herein.

In the present specification and claims the word "a" or "an" preceding an element does not exclude the presence of a plurality of such elements. Further, the word "comprising" does not exclude the presence of other elements or steps than those listed.

The invention claimed is:

1. A radio communication system, comprising:
   a primary station;
   a plurality of secondary stations;
   a communication channel between the primary station and a first secondary station, the communication channel including an uplink and a downlink control channel for transmission of control information, including power control commands, and a data channel for the transmission of data;
   power control means for adjusting the power of the control and data channels in response to the power control commands;
   means for setting an initial transmission power after an interruption in transmission to that before the interruption adjusted by an offset; and
   means for determining the offset from a difference between a last transmission power and a weighted average of the transmission power over a predetermined period before the interruption in transmission.

2. The radio communication system as claimed in claim 1, further comprising:
   means for determining the offset from a weighted sum of the power control commands applied before the interruption in transmission.

3. The radio communication system as claimed in claim 1, further comprising:
   means for quantizing the offset to an available power control step size.

4. A radio communication system, comprising:
   a primary station;
   a plurality of secondary stations;
   a communication channel between the primary station and a first secondary station, the communication channel including an uplink and a downlink control channel for transmission of control information, including power control commands, and a data channel for the transmission of data;
   power control means for adjusting the power of the control and data channels in response to the power control commands; and
   means for setting an initial transmission power after an interruption in transmission to that before the interruption adjusted by an offset; and
   means for determining the offset from a weighted sum of power control commands in accordance with an equation $\Delta P(t)=K_1\Delta P(t-1)-K_2 PC(t)PS(t)$, where $\Delta P(t)$ is the offset computed at a time t of a last power control command before the interruption, $\Delta P(t-1)$ is a previously-determined offset, $PC(t)$ is the power control command applied at the time t, $PS(t)$ is a size of the power control step applied at the time t, $K_1$ and $K_2$ are constants and $\Delta P(0)$ is set to zero at the start of the transmission; and
   means for quantizing the offset to an integer multiple of a minimum power control step size supported by the station transmitting the channel.

5. A primary station for use in a radio communication system having a communication channel between the primary station and a secondary station, the channel including an uplink and a downlink control channel for transmission of control information, including power control commands, and a data channel for the transmission of data, the primary station comprising:
   power control means for adjusting the power of the control and data channels in response to the power control commands; and
   means for setting an initial transmission power after an interruption in transmission to that before the interruption adjusted by an offset; and
   means for determining the offset from a difference between a last transmission power and a weighted average of the transmission power over a predetermined period before the interruption in transmission.

6. The primary station as claimed in claim 5, further comprising:
   means for determining the offset from a weighted sum of the power control commands applied before the interruption in transmission.

7. The primary station as claimed in claim 5, further comprising:
   means for quantizing the offset to an available power control step size.

8. A primary station for use in a radio communication system having a communication channel between the primary station and a secondary station, the channel including an uplink and a downlink control channel for transmission of control information, including power control commands, and a data channel for the transmission of data, the primary station comprising:
   power control means for adjusting the power of the control and data channels in response to the power control commands; and
   means for setting an initial transmission power after an interruption in transmission to that before the interruption adjusted by an offset;
   means for determining the offset from a weighted sum of power control commands in accordance with an equation $\Delta P(t)=K_1\Delta P(t-1)-K_2 PC(t)PS(t)$, where $\Delta P(t)$ is the offset computed at a time t of a last power control command before the interruption, $\Delta P(t-1)$ is a previously-determined offset, $PC(t)$ is the power control command applied at the time t, $PS(t)$ is a size of the power control step applied at the time t, $K_1$ and $K_2$ are constants and $\Delta P(0)$ is set to zero at the start of the transmission; and
   means for quantizing the offset to an integer multiple of a minimum power control step size supported by the primary station.

9. A secondary station for use in a radio communication system having a communication channel between the secondary station and a primary station, the channel including an uplink and a downlink control channel for transmission of control information, including power control commands, and a data channel for the transmission of data, the secondary station comprising:
   power control means for adjusting the power of the uplink control and data channels in response to the downlink power control commands;
   means for setting an initial transmission power after an interruption in transmission to that before the interruption adjusted by an offset; and
   means for determining the offset from a difference between a last transmission power and a weighted average of the transmission power over a predetermined period before the interruption in transmission.

10. The secondary station as claimed in claim 9, wherein the offset is predetermined.

11. The secondary station as claimed in claim 9, further comprising:
    means for determining the offset from a weighted sum of the power control commands applied before the interruption in transmission.

12. The secondary station as claimed in claim 9, further comprising:
   means for quantizing the offset to an available power control step size.

13. A secondary station for use in a radio communication system having a communication channel between the secondary station and a primary station, the channel including an uplink and a downlink control channel for transmission of control information, including power control commands, and a data channel for the transmission of data, the secondary station comprising:
   power control means for adjusting the power of the uplink control and data channels in response to the downlink power control commands;
   means for setting an initial transmission power after an interruption in transmission to that before the interruption adjusted by an offset; and means for determining the offset from a weighted sum of power control commands in accordance with an equation $\Delta P(t)=K_1\Delta P(t-1)-K_2 PC(t)PS(t)$, where $\Delta P(t)$ is the offset computed at a time t of a last power control command before the interruption, $\Delta P(t-1)$ is a previously-determined offset, $PC(t)$ is the power control command applied at the time t, $PS(t)$ is the size of the power control step applied at the time t, $K_1$ and $K_2$ are constants and $\Delta P(0)$ is set to zero at the start of a transmission or immediately after a gap, and in that means are provided for quantizing the offset to an integer multiple of a minimum power control step size supported by the secondary station.

* * * * *